3,230,219
N-(4 - MORPHOLINOTHIOPHENYL) - N' - PHENYL-p-PHENYLENEDIAMINE AND PROCESS FOR ITS PRODUCTION
Ernest Csendes, Atlanta, Ga., assignor to E. I. du Pont de Nemours and Company, Wilmington, Del., a corporation of Delaware
No Drawing. Filed Jan. 22, 1962, Ser. No. 167,943
4 Claims. (Cl. 260—247.1)

This invention relates to new 4-(morpholinothio)-arylamines and to a process for their preparation. More particularly, this invention relates to cured elastomers containing said new compounds as antioxidants.

Certain aromatic secondary amines are known to be effective antioxidants for natural rubber and synthetic rubber, hereinafter referred to collectively as elastomers. However when elastomers are exposed to high temperatures, there is a tendency for the organic antioxidant materials to be lost because of volatization.

It is an object of the present invention to provide new compounds which are less volatile than conventional secondary aromatic amine antioxidants, and which retain to a significant degree their antioxidant activity. A further object of this invention is to provide the hereinafter described new 4-(morpholinothio)arylamine compounds and a process for their preparation. A further object is to provide new and improved antioxidants for elastomers. A still further object is to provide elastomeric materials which contain said novel antioxidants. Other objects will appear hereinafter.

These and other objects are accomplished by 4-(morpholinothio)arylamines of the formula

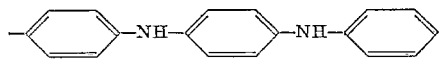

in which R is

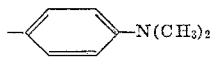

or

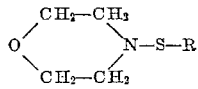

The first of these new compounds, N-(4-morpholinothiophenyl)-N'-phenyl-p-phenylenediamine, can be prepared by reacting morpholinosulfenyl chloride with N,N'-diphenyl-p-phenylenediamine. The second new compound, N,N-dimethyl-4-(morpholinothio)aniline, can be prepared by reacting morpholinosulfenyl chloride with N,N-dimethylaniline.

Said reactions can be carried out in an inert organic solvent, such as carbon tetrachloride, under reflux conditions. Representative examples of other solvents that would be suitable are chlorotrifluoromethane, tetrachloroethylene, trichloroethylene, and 1,1,1 - trichloroethane. On cooling, the product precipitates from the solvent and may be filtered off. If desired, the product may be further purified by conventional methods, such as by recrystallization.

The starting materials for these syntheses are known materials. Morpholinosulfenyl chloride can be prepared by reacting chlorine with 4,4'-dithiodimorpholine as described by A. Dorlars in Houben-Weyl, "Methoden der Organischen Chemie," 4th ed., volume 11, part 2, page 745, and German Patent 965,968. The morpholinosulfenyl chloride may be used without isolation from the reaction medium for the condensation with the amino compound.

The compounds of this invention are effective antioxidants for protecting elastomeric materials against oxidative deterioration during aging. The compounds are suitable for use in natural rubber and in synthetic rubber particularly that which is prepared from conjugated hydrocarbon dienes, such as butadiene-styrene copolymers, cis-polybutadiene, and cis-polyisoprene. Because of their relatively low volatility, the antioxidant compounds of this invention are exceptionally persistent in elastomers which are subjected to high temperatures.

The antioxidant can be added to the dry elastomeric material in known ways, such as by blending on a roll mill or in a Banbury mixer, or an aqueous dispersion of the antioxidant may be added to the polymer latex.

Amounts of from about 0.1 to 5.0 parts by weight per 100 parts of elastomeric material may be used, depending on the degree of protection desired, the type of elastomeric material, and the conditions of use. Less than 0.1 part usually does not give adequate protection, and more than 5.0 parts is not needed and is wasteful of materials.

The compounds of this invention may in general be used with any of the usual elastomer compounding ingredients, such as vulcanizing agents, plasticizers, pigments, fillers, extenders, and reinforcing agents.

Representative examples illustrating the present invention are as follows. Parts are by weight unless otherwise indicated.

EXAMPLE A

*Preparation of morpholinosulfenyl chloride*

354 grams of 4,4'-dithiodimorpholine are suspended in 1200 ml. of carbon tetrachloride and the suspension is cooled to 0° C. 116 grams of chlorine gas is passed into the solution while maintaining the temperature at 0–6° C. Excess chlorine is blown out with air, and the clear yellow solution containing the morpholinosulfenyl chloride produced is used for the preparation of the compounds of Examples 1 and 2.

EXAMPLE 1

231 ml. of the solution containing morpholinosulfenyl chloride, prepared as described in Example A, is added to a solution of 98 grams of N,N'-diphenyl-p-phenylenediamine in 150 ml. of carbon tetrachloride and refluxed for 30 minutes. The solution is cooled and the crystals which precipitate are filtered off. The product melts at 170° C. (The parent N,N'-diphenyl-p-phenylenediamine melts at 146° C.) Analysis for sulfur shows 9.25%, as compared to 9.1% calculated for N-(4-morpholinothiophenyl)-N'-phenyl - p - phenylenediamine. The infrared spectrum shows an —NH— band at $3.02\mu$ and an ether band at $9.07\mu$.

The compound so prepared is incorporated as the antioxidant into a rubber stock using the following recipe:

```
                                                Parts by weight
Natural rubber smoked sheets _____ 100
Easy processing channel black _____ 40
Stearic acid _____ 3
Zinc oxide _____ 5
Sulfur _____ 2.8
2-mercaptobenzothiazole _____ 1
Antioxidant _____ 1
```

The compounded stock is press cured in preheated molds for 45 minutes at 144° C. Test pieces 25–30 mils in thickness are subjected to accelerated aging at 121° C. for 24 hours as described in ASTM D 865–54T. Tensile properties are measured before and after aging at 25° C. using an Instron tensile tester and pulling at a speed of 20 inches per minute. Test results are shown in Table I compared with results obtained from a control sample containing no antioxidant. After aging, the sample containing the test compound shows an improvement of more than 50% in retention of tensile strength.

TABLE I

|  | N-(4-Morpholinothiophenyl)-N'-phenyl-p-phenylenediamine Antioxidant | No Antioxidant |
| --- | --- | --- |
| Original: |  |  |
| Tensile Strength at Break, p.s.i. | 4,200 | 4,490 |
| Elongation at Break, Percent | 475 | 515 |
| After Aging: |  |  |
| Tensile Strength at Break, p.s.i. | 750 | 515 |
| Elongation at Break, Percent | 120 | 110 |
| Percent Tensile Retained | 17 | 11 |

EXAMPLE 2

231 ml. of the solution containing morpholinosulfenyl chloride, prepared as described in Example A, are added to a solution of 46 grams of N,N-dimethylaniline in 150 ml. of carbon tetrachloride. The solution is refluxed for 30 minutes. The solution is cooled, and the crystals which precipitate are filtered off. The product is washed with ether, slurried in acetone, dried, and washed with water. The product, N,N-dimethyl-4-(morpholinothio)aniline, melts at 83° C. Sulfur analysis shows 13.35% sulfur, as compared to the calculated 13.45% sulfur. The infrared spectrum shows the ether band 9.12 (s) μ.

The compound is evaluated as an antioxidant as described in Example 1. Table II shows the results compared with those obtained from a control sample containing no antioxidant. After aging, the sample containing the test compound shows an improvement of more than 100% in retention of tensile strength.

TABLE II

|  | N,N-Dimethyl-4-(morpholinothio)aniline Antioxidant | No Antioxidant |
| --- | --- | --- |
| Original: |  |  |
| Tensile Strength at Break, p.s.i. | 4,200 | 4,490 |
| Elongation at Break, percent | 500 | 515 |
| After Aging: |  |  |
| Tensile Strength at Break, p.s.i. | 950 | 515 |
| Elongation at Break, percent | 160 | 110 |
| Percent Tensile Retained | 23 | 11 |

It is evident from the foregoing examples that N-(4-morpholinothiophenyl) - N' - phenyl-p-phenylenediamine and N,N-dimethyl-4-(morpholinothio)aniline reduce the deleterious effect of aging on the tensile properties of elastomers. As many apparently different embodiments of this invention may be made without departing from the spirit and scope thereof, it is to be understood that this invention is not limited to the specific embodiments thereof except as defined in the appended claims.

What is claimed is:

1. N - (4 - morpholinothiophenyl)-N'-phenyl-p-phenylenediamine.

2. A process which comprises contacting and reacting morpholinosulfenyl chloride with an aromatic amine selected from the group consisting of N,N'-diphenyl-p-phenylenediamine and N,N-dimethylaniline and obtaining as a result thereof a 4-(morpholinothio)arylamine of the formula

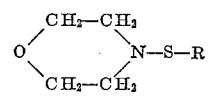

wherein R is a member selected from the group consisting of

and

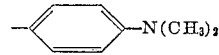

3. A process which comprises contacting and reacting morpholinosulfenyl chloride with N,N'-diphenyl-p-phenylenediamine and obtaining as a result thereof N-(4-morpholinothiophenyl)-N'-phenyl-p-phenylenediamine.

4. A process which comprises contacting and reacting morpholinosulfenyl chloride with N,N-dimethylaniline and obtaining as a result thereof N,N-dimethyl-4-(morpholinothio)aniline.

References Cited by the Examiner

UNITED STATES PATENTS

| Re. 19,286 | 8/1934 | Zaucker et al. | 260—293.4 |
| 1,899,058 | 2/1933 | Reed | 260—800 |
| 2,041,854 | 5/1936 | Neal | 260—800 |
| 2,045,888 | 6/1936 | Tschunkur et al. | 260—247.1 |
| 2,067,978 | 1/1937 | Neal | 260—800 |
| 2,351,657 | 6/1944 | Bayes | 260—247.1 |
| 2,387,499 | 10/1945 | Daly | 260—45.8 |
| 2,616,871 | 11/1952 | Newby | 260—45.8 |
| 2,868,633 | 1/1959 | Goodhue | 260—247.1 |
| 2,911,405 | 11/1959 | Gregg | 260—247.1 |
| 3,070,599 | 12/1962 | Hendry et al. | 260—247.1 |

NICHOLAS S. RIZZO, Primary Examiner.

L. J. BERCOVITZ, JOHN D. RANDOLPH, Examiners.